United States Patent
Soderquist et al.

[11] Patent Number: 5,094,814
[45] Date of Patent: Mar. 10, 1992

[54] ALL-VOLATILE MULTI-FUNCTIONAL OXYGEN AND CARBON DIOXIDE CORROSION CONTROL TREATMENT FOR STEAM SYSTEMS

[75] Inventors: Cynthia A. Soderquist, Bolingbrook; Mei-Jan L. Lin, Naperville, both of Ill.

[73] Assignee: Nalco Chemical Company, Naperville, Ill.

[21] Appl. No.: 538,432

[22] Filed: Jun. 15, 1990

[51] Int. Cl.$^5$ .............................................. C02F 1/20
[52] U.S. Cl. ................................... 422/16; 210/698; 210/750; 252/392; 252/393; 252/394; 252/396; 252/401; 252/403; 252/404; 252/407; 422/14; 422/19
[58] Field of Search .................... 422/14, 16, 19; 252/392, 393, 394, 396, 401, 403, 404, 405, 407; 210/698, 750

[56] References Cited

U.S. PATENT DOCUMENTS

| | | |
|---|---|---|
| 4,067,690 | 10/1978 | Cuisia et al. |
| 4,278,635 | 7/1981 | Kerst . |
| 4,279,767 | 7/1981 | Muccitelli . |
| 4,282,111 | 8/1981 | Ciuba . |
| 4,289,645 | 9/1981 | Muccitelli . |
| 4,350,606 | 9/1982 | Cuisia et al. . |
| 4,363,734 | 12/1982 | Slovinsky . |
| 4,540,494 | 9/1985 | Fuchs et al. . |
| 4,541,932 | 9/1985 | Muccitelli . |
| 4,549,968 | 10/1985 | Muccitelli . |
| 4,569,783 | 2/1986 | Muccitelli . |
| 4,847,001 | 7/1989 | Cuisia et al. ............... 422/16 |

FOREIGN PATENT DOCUMENTS

0039130  3/1981  European Pat. Off. .

*Primary Examiner*—Timothy M. McMahon
*Attorney, Agent, or Firm*—Donald G. Epple; Robert A. Miller

[57] ABSTRACT

A combination product containing (a) dihydroxyacetone, (b) hydroquinone, and (c) a volatile amine that is capable of removing oxygen and neutralizing carbon dioxide in industrial waters, particularly boiler waters, including boiler feed waters, internal boiling waters, condensate waters, and return waters. The combination product preferably contains weight ratios of ingredients (a):(b):(c) ranging from 1:0.01:0.1 to about 1:1:100, and may additionally contain a filming amine.

21 Claims, 6 Drawing Sheets

ALL-VOLATILE MULTI-FUNCTIONAL OXYGEN AND CARBON DIOXIDE CORROSION CONTROL TREATMENT FOR STEAM SYSTEMS

INTRODUCTION

The treatment of waters used in boiler steaming systems to remove therefrom oxygen which is dissolved or dispersed therein has been practised for many years. The removal of these oxygen gases from boiler waters prevents corrosion which is caused by the oxygen content in the boilers under operating condition of the boilers when steaming. Often, this treatment occurs prior to the boiler waters, including waters being fed to the boilers, but may also occur in internal boiling waters in the internals of the operating boiler, and may also be necessary in the treatment of condensate waters and return waters being generated after the steam has been used and condensed. All of these sources of boiler waters, which may return to be fed to the boiler, may be treated for removal of oxygen.

In addition, if $CO_2$ builds up, for example through alkalinity decomposition in the boiler, degradation of organic compounds used to treat boiler waters, or from dissolving $CO_2$ from air in contact with boiler waters, this source of acidity can also cause difficulties and corrosion in an operating boiler system. Generally, the treatment of oxygen and the treatment of $CO_2$ have been separate treatments. It would, therefore, be an advance in the art to have a single treatment that would both remove oxygen dissolved in boiler waters as well as neutralize $CO_2$ dissolved in boiler waters.

Boiler water treatment has traditionally used hydrazine and/or sulfite salts to remove oxygen, but boiler water treatment has progressed beyond these compounds over the years and, the most recent progress can be reasonably demonstrated by the following patents:

U.S. Pat. No. 4,067,690, Cuisia et al., which discloses a method for treating boiler waters by adding thereto hydroxylamine and certain derivatives thereof to effectively reduce corrosion resulting from dissolved oxygen. The preferred oxygen scavenger is N,N-diethylhydroxylamine.

U.S. Pat. No. 4,278,635, Kerst, teaches a method for boiler water treatment retarding corrosion due to dissolved oxygen by using hydroquinone and certain related compounds thereof as the sole oxygen scavenger.

U.S. Pat. No. 4,279,767, Muccitelli, teaches an improved oxygen scavenger comprising hydrazine-free solutions of hydroquinone and mu-amines. A mu-amine is defined basically as a neutralizing amine which does not form insoluble residues or precipitates with hydroquinone when combined in an aqueous solution under prescribed conditions.

U.S. Pat. No. 4,282,111, Ciuba, discloses a method for reducing oxygen content in waters using a hydrazine-free aqueous solution of hydroquinone. The hydroquinone is used as the sole oxygen scavenger in a boiler condensate steam system. The waters treated have alkaline pHs and may contain NaOH.

U.S. Pat. No. 4,289,645, Muccitelli, teaches an improved oxygen scavenger for aqueous media comprising hydrazine-free solutions of hydroquinone and mu-amines and claims compositions of hydroquinone and mu-amines in such combination as to increase oxygen scavenging efficiency of the hydroquinone. The mu-amines are similarly defined as in U.S. Pat. No. 4,279,767, above.

U.S. Pat. No. 4,350,606, Cuisia et al., teaches control of corrosion in steam condensate lines by maintaining a mix therein of hydroxylamine compounds and neutralizing amines.

U.S. Pat. No. 4,363,734, Slovinsky, teaches improved methods for scavenging dissolved oxygen from alkaline waters comprising using dihydroxy acetone catalyzed with at least one percent, based on the weight of dihydroxy acetone, of catalyst chosen from hydroquinone and manganese compounds.

U.S. Pat. No. 4,540,494, Fuchs et al., teaches a method of removing oxygen from dissolved water based on hydrazine absent organic activators, simultaneously using complexes of cobalt, which complexes are formed using inorganic ligands.

U.S. Pat. No. 4,541,932, Muccitelli, teaches the use of furfural catalyzed by hydroquinone for chemically scavenging oxygen from aqueous media, especially in boiler water systems. The furfural and hydroquinone could also be combined with neutralizing amines.

U.S. Pat. No. 4,549,968, Muccitelli, teaches stable oxygen scavenger compositions comprising hydroquinone, mu-amines, erythorbic and ascorbic acids, all three in admixture therein.

U.S. Pat. No. 4,569,783, Muccitelli, teaches composition and methods for scavenging oxygen from aqueous media using salicylaldehyde catalyzed by hydroquinone, also in the presence of neutralizing amines. Hydroquinone is present in a catalytic amount to catalyze the oxygen scavenging capability of salicylaldehyde in the presence of the neutralizing amines.

In addition, there are some foreign patent applications, normally corresponding to at least one of the applications above, which are known. Representative of these applications, but by all means not a complete list, are the following:

European Patent Application 0 039 130, Ciuba, which teaches the reduction of oxygen content in water by using hydrazine-free dioxo aromatic compounds or organically substituted derivatives thereof.

All of the patents listed above are incorporated herein by reference.

None of the patents above teach a system using dihydroxyacetone in combination with catalytic amounts of hydroquinone, which combination is greatly improved when further combined with neutralizing and volatile amines for the purpose of scavenging oxygen from and neutralizing $CO_2$ in waters, particularly boiler waters.

THE INVENTION

Our invention makes such a ternary combination. By combining dihydroxyacetone with catalytic amounts of hydroquinone and neutralizing and volatile amines, we can treat oxygen dissolved in waters as well as neutralize $CO_2$ dissolved in waters, particularly boiler waters to solve two problems simultaneously. The problems solved are corrosion caused by oxygen and corrosion caused by $CO_2$, not only of boiler system internals, but also in overhead steam condensate systems, condensate return lines, and the like.

Our invention includes a composition comprising an admixture of dihydroxyacetone, hydroquinone, and a volatile amine.

Preferably, this composition contains dihydroxyacetone, hydroquinone, and the volatile amine in weight ratios ranging from about 1.0 : 0.01 : 0.1 to about 1.0 : 1.0

:100. These compositions can also contain the weight ratios of dihydroxyacetone to hydroquinone ranging from 1: 0.05 to about 1:1, as well as the weight ratios of dihydroxyacetone to volatile amine ranging from 1:0.5 to 1:50, and may also contain the weight ratios of hydroquinone to a volatile amine ranging from 1:1 to about 1:100.

These compositions are preferably compositions contained in a formulation which also contains water. The formulation may additionally contain filming amines, such as octadecylamine, ethoduomeen, or mixtures thereof. In addition, the formulation may contain coupling agents, surfactants, dispersants, or other solvents to assist stability in solution, as needed, of all ingredients contained within these formulations.

A preferred composition to be used to remove dissolved oxygen from water comprises an admixture of
(a) dihydroxyacetone 0.1—10.0 wt. %
(b) hydroquinone 0.005—10.0 wt. %
(c) volatile amine 0.01—50.0 wt. %
(d) water the remainder,
such that the weight ratio of (a):(b) does not exceed 1:1.

These preferred compositions may further contain from 0.01 to about 25 weight percent of a filming amine. These filming amines are preferably chosen from the group consisting of octadecylamine, ethoduomeen, and mixtures thereof. Also, certain of these volatile amines can react with hydroquinone to form precipitates or gums, insoluble in pure water. This formation of insolubles does not necessarily negate the effectiveness of the combinations above. However, if this situation develops coupling agents, surfactants, dispersants, and/or cosolvents may be used to formulate these compositions for optional use. Also, water formulations containing these ingredients may have adjusted pHs between about 7.0 to about 11.5, or above. Often the pH is adjusted by the amount of volatile amine added to the formulation, but other pH adjustment agents, such as $H_2SO_4$, $HNO_3$, NaOH, and the like may be used as well.

DIHYDROXYACETONE

Dihydroxyacetone (sometimes referred herein as DHA) has the formula given in Formula I, below. This material may also be purchased as its dimer often given the structure in Formula II, labelled Dihydroxyacetone, cyclic dimer.

Dihydroxyacetone in water, particularly in water having a pH above 8.0, has a complicated nuclear magnetic resonance spectrum which indicates the possibility of dimer and/or trimer formation and perhaps even higher oligomers. The spectra also indicates the possibility that said dimers and trimers are not only cyclic, as presented above in Formula II, but also may be linear dimers, trimers, and higher oligomers or combinations thereof. Our use of the term dihydroxyacetone indicates the presence of dihydroxyacetone as represented in Formula I and/or as represented in Formula II or any other dimer/trimer or above oligomeric compound formed in aqueous media.

HYDROQUINONE

Hydroquinone is a 1,4-dihydroxybenzene compound which is readily known in the art, see for example those patents cited above containing hydroquinone. The use of hydroquinone in this combination is at essentially catalytic amounts for the purpose of catalyzing the oxygen scavenging capabilities of dihydroxyacetone, its dimers, trimers, oligomers, and the like. Hydroquinone is present in the formulations of this invention at weight ratios ranging from about 1.0: 0.01 to about 1.0:1.0 of dihydroxyacetone to hydroquinone. Preferably, these weight ratios range from about 1:0.05 to about 1:0.50, and most preferably these weight ratios range from about 1:0.1 to about 1:0.25.

THE VOLATILE AMINES

The volatile amines are those amines which, when added to an operating boiler system having an internal temperature of at least 100° C., will volatilize at least one tenth weight percent of the amine added to such a system into the steam, which amine then is partially or completely condensed and collected within the steam condensate system so that the amine may be found in the condensate water derived therefrom. These volatile amines should also be neutralizing amines and may be chosen from the group consisting of at least one of the volatile amines including morpholine (MORPH), cyclohexylamine (CHA), diethylaminoethanol (DEAE), methoxypropylamine (MOPA), monoethanolamine (MEA), and dimethylaminoisopropanol (DMAIP), isopropylamine (IPA), and any wherein $R_1$ and $R_2$ are each individually chosen from the group consisting of linear or branched alkyl groups having from one to four carbon atoms, preferably diethylhydroxylamine (DEHA).

The volatile amines of this invention are those amines which may be neutralizing amines and which are preferably sufficiently volatile so that when added to a boiler operating at a temperature of at least 100° C., volatilize at least about one percent by weight into the steam being formed in a way that the waters condensed from the steam and collected in the boiler condensate system contain at least some quantities of these volatile amines. These volatile amines preferably are neutralizing amines and are preferably chosen from the group consisting of morpholine, cyclohexylamine, diethylaminoethanol, methoxypropylamine, monoethanolamine, and dimethylaminoisopropanol, isopropylamine, and any of the dialkylhydroxylamines having the structure given above. Preferably, the dialkylhydroxylamine is diethylhydroxylamine. The amines may be used singly or in any combination or mixture thereof when used within the scope of the invention.

THE FILMING AMINE

A filming amine may also be added to the composition. A filming amine normally is amine that contains at least one hydrophobic hydrocarbon group, which amine has a tendency to coat out or film on metallic surfaces in contact with aqueous solutions or dispersions containing these filming amines. An example of these filming amines are amines chosen from the group consisting of octadecylamine, ethoduomeen, or mixtures thereof. However, these filming amines may normally be any amine compound which contains in combination a total of at least sixteen carbon atoms attached to the nitrogen group, preferably in linear or branched alkyl substitution. These filming amines may be polyamines containing two or more nitrogen groups as long as the amine has the tendency to film on metal surfaces in contact with the water in which the amine is dispersed or dissolved. The amines may be added to our formulations as the free amine or any common acid salt thereof, for example the sulfuric acid salt of octadecylamine. In general, by the use of the term "filming amine", we mean an alkyl or dialkyl substituted amine or polyamine containing at least about sixteen (16) carbon atoms within the substituents attached to the amino nitrogen, or water-soluble or dispersible acid salts thereof.

These filming amines may be contained in our preferred compositions at anywhere from about 0.01 to about 25 weight percent, preferably from about 0.1 to about 20 weight percent, and most preferably from about 0.1 to about 10 weight percent. The most preferred filming amine is octadecylamine.

METHODS OF USE IN BOILERS

Our invention also includes a method of removing dissolved oxygen from and neutralizing dissolved $CO_2$ in boiler waters which comprises treating said boiler waters with an effective oxygen-removing amount of a combination product comprising dihydroxyacetone, hydroquinone, and a volatile amine. This combination product may additionally contain a filming amine.

The combination product containing (a) dihydroxyacetone, (b) hydroquinone, and (c) a volatile amine, is normally formulated in a water solution or dispersion such that the weight ratio of (a):(b):(c) ranges from about 1:0.01:0.10 to about 1:1:100. The method of removing dissolved oxygen and neutralizing dissolved $CO_2$ normally comprises treating the boiler waters in which dissolved oxygen and dissolved $CO_2$ exist with the combination product described above such that the molar ratio of dihydroxyacetone contained in the admixture to dissolved oxygen in the boiler waters ranges from about 0.5:1 to about 10.0:1.0. By the term "boiler water", we mean boiler-feed water, internal boiling water, condensate waters, and the like.

Preferably, the method of removing dissolved oxygen and neutralizing dissolved $CO_2$ in boiler waters comprises treating these boiler waters with the combination product described above such that the molar ratio of dihydroxyacetone contained in the combination product to dissolved oxygen in the boiler water is from at least 1:1 up to a molar ratio of about 8:1.

In a preferable treatment, the ratio of dihydroxyacetone, hydroquinone, and the volatile amine ranges from about 1.0:0.1:1.0 to about 1.0:0.75:50, and this combination product in a water formulation which may contain from 0.5 to about 50.0 weight percent dissolved solids, or higher is used to treat boiler water such that the mole ratio of $DHA:O_2$ range between about 1:1 to about 8:1 most preferably between about 2:1 to about 4:1. As before, the method of treating these boiler waters can include the addition of the combination products described above which additionally contain at least about 1.0 weight percent of a filming amine.

In a preferred method, both dissolved oxygen and dissolved $CO_2$ are removed or neutralized from boiler waters, which method comprises treating said boiler waters with an effective oxygen-reducing amount of a combination product, where the combination product contains the ingredients:

(a) dihydroxyacetone 0.1—10.0 wt. %
(b) hydroquinone 0.005—10.0 wt. %
(c) a volatile amine chosen from the group consisting of at least one amine from the group morpholine, cyclohexylamine, diethylaminoethanol, methoxypropylamine, monoethanolamine, dimethylaminoisopropanol, isopropylamine, and dialkylhydroxylamines having the structure where $R_1$ and $R_2$ individually and independently are chosen from linear and branched alkyl groups having from 1–4 carbon atoms 0.01–50.0 wt %

(d) water the remainder,
such that the weight ratio of (a):(b) does not exceed 1:1, preferably does not exceed 1:0.5, and most preferably does not exceed about 1:0.25.

Most preferably, the catalytic amounts of hydroquinone used with dihydroxyacetone are in the ratio ranging from about 1:0.01 to about 1:1, preferably in the ratio between about 1:0.05 to about 1:0.5, and most preferably between about 1:0.1 to about 1:0.25.

Hydroquinone is used primarily as a catalyst to enhance the ability of dihydroxyacetone and its dimers/trimers/oligomers, and the like, to react with oxygen. It is used at concentrations in the combination product described above such that were it there by itself, even in the presence of the neutralizing amines, some of which are mu-amines, as defined by Muccitelli above, it would not be sufficient to remove all of the oxygen present in the waters being treated.

To better illustrate the combinations above and the surprising results obtained by making these combinations, the following experimental results are presented.

EXPERIMENTS

Figure 1:
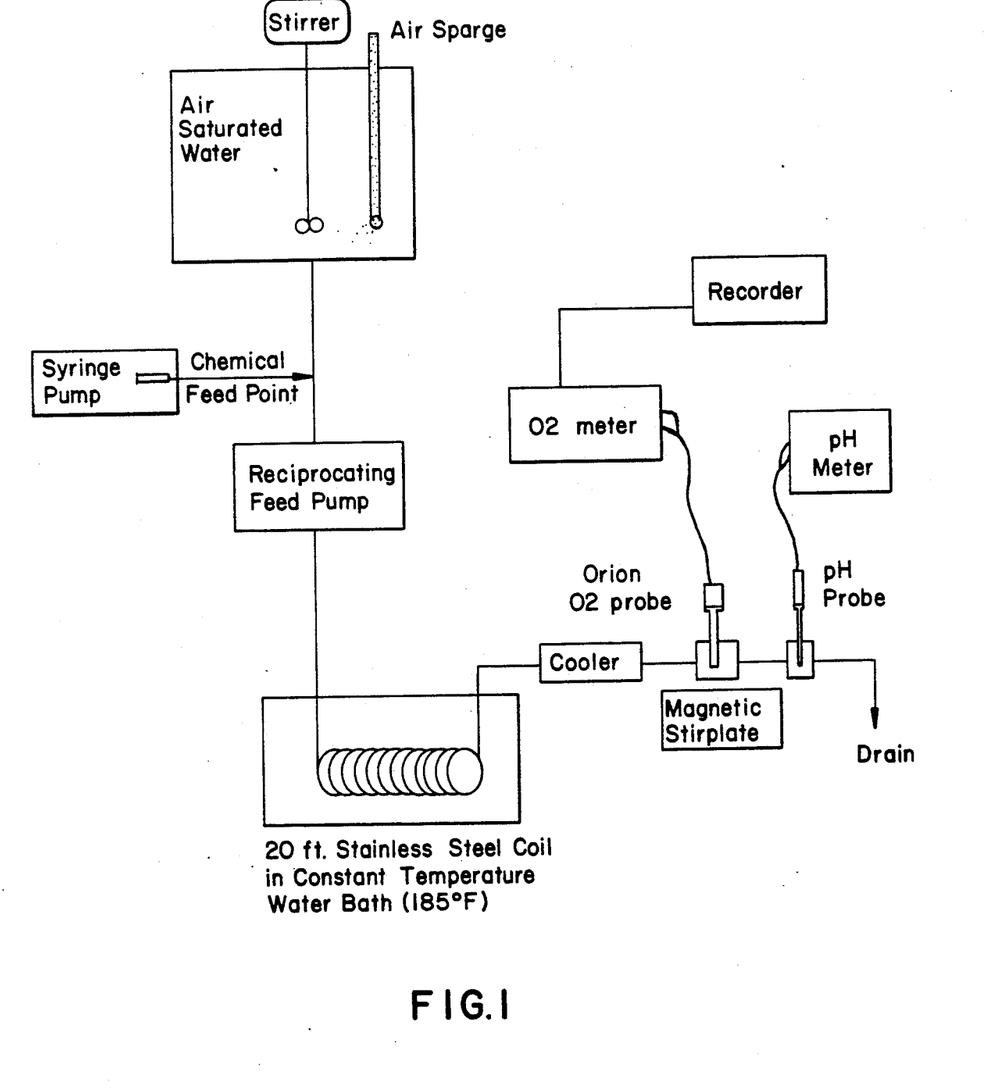
FIG. 1 is described above and outlines the testing equipment used to measure oxygen scavenging at 185° F.
Figure 2:
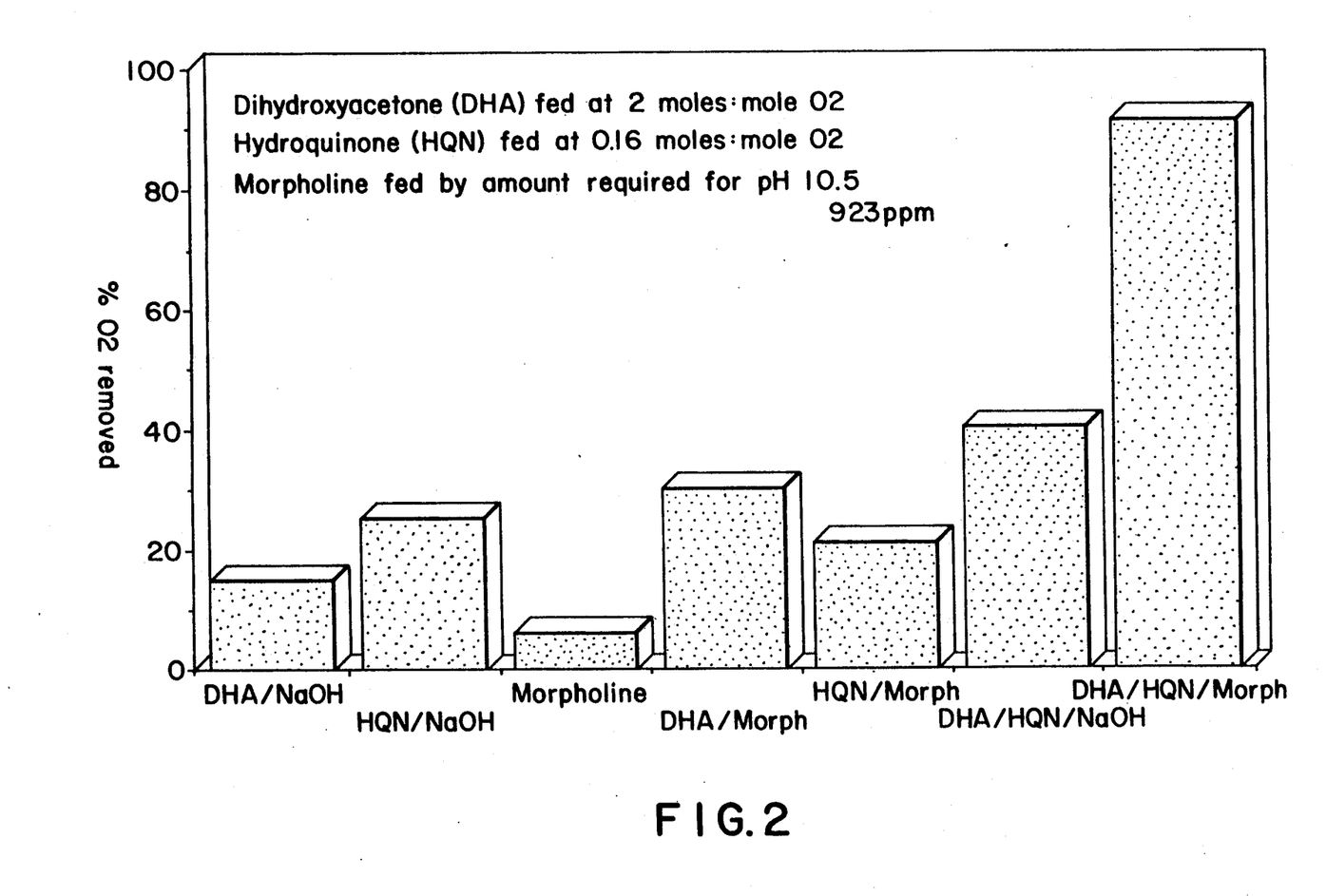
FIG. 2 describes and illustrates the percent oxygen removed using dihydroxyacetone in combination with NaOH, morpholine, hydroquinone, and dihydroxyacetone in the presence of both hydroquinone and morpholine. As can be readily demonstrated and observed in this Figure, the ternary combination is by far the most outstanding and surprising result in terms of its ability to remove oxygen from waters.
Figure 3:
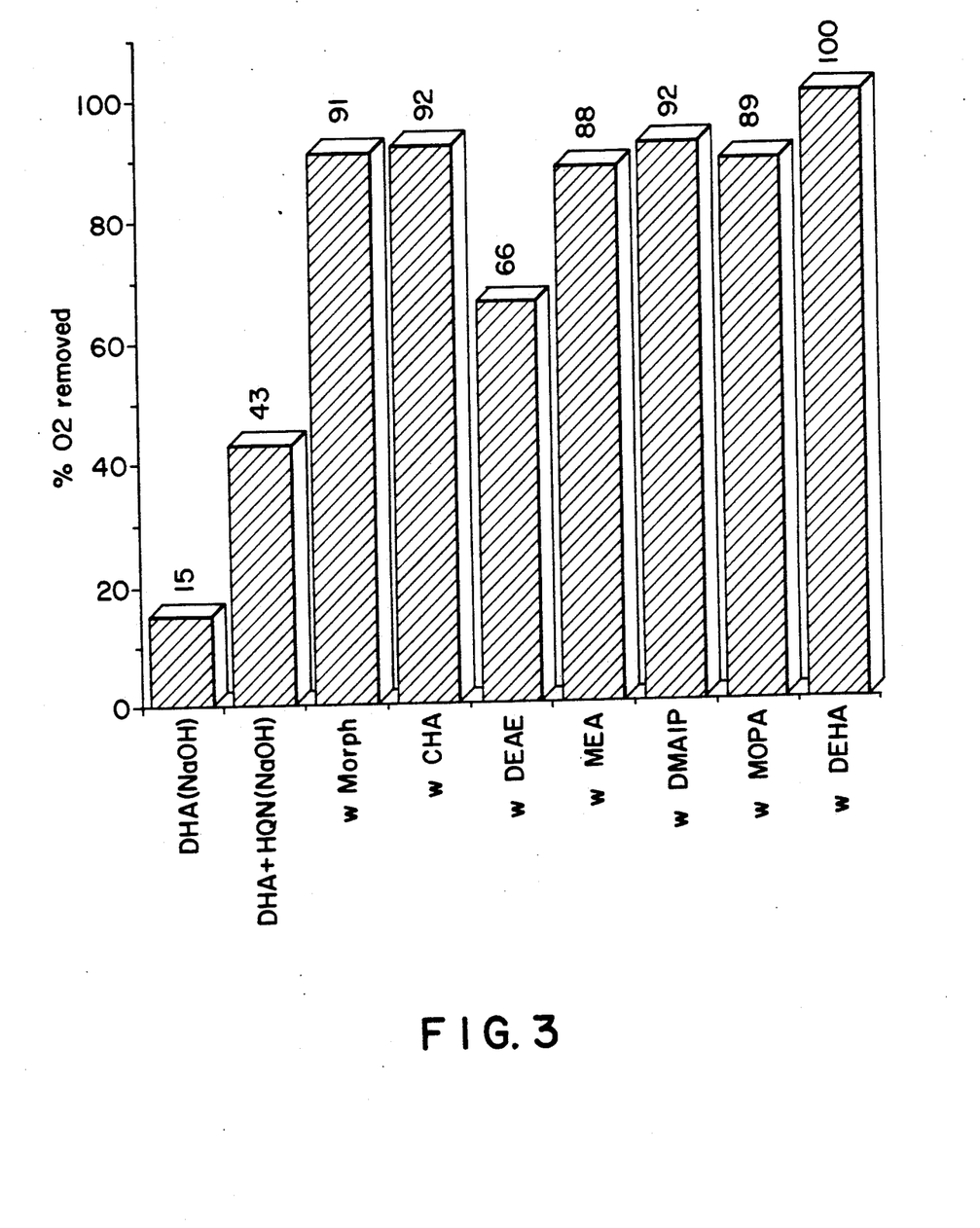
FIG. 3 also describes the use of a 2.0 mole ratio to oxygen of dihydroxyacetone hydroquinone, and different volatile amines, as well as NaOH, and again demonstrates the surprising results of the ternary combination of dihydroxyacetone, hydroquinone, and a volatile amine.
Figure 4:
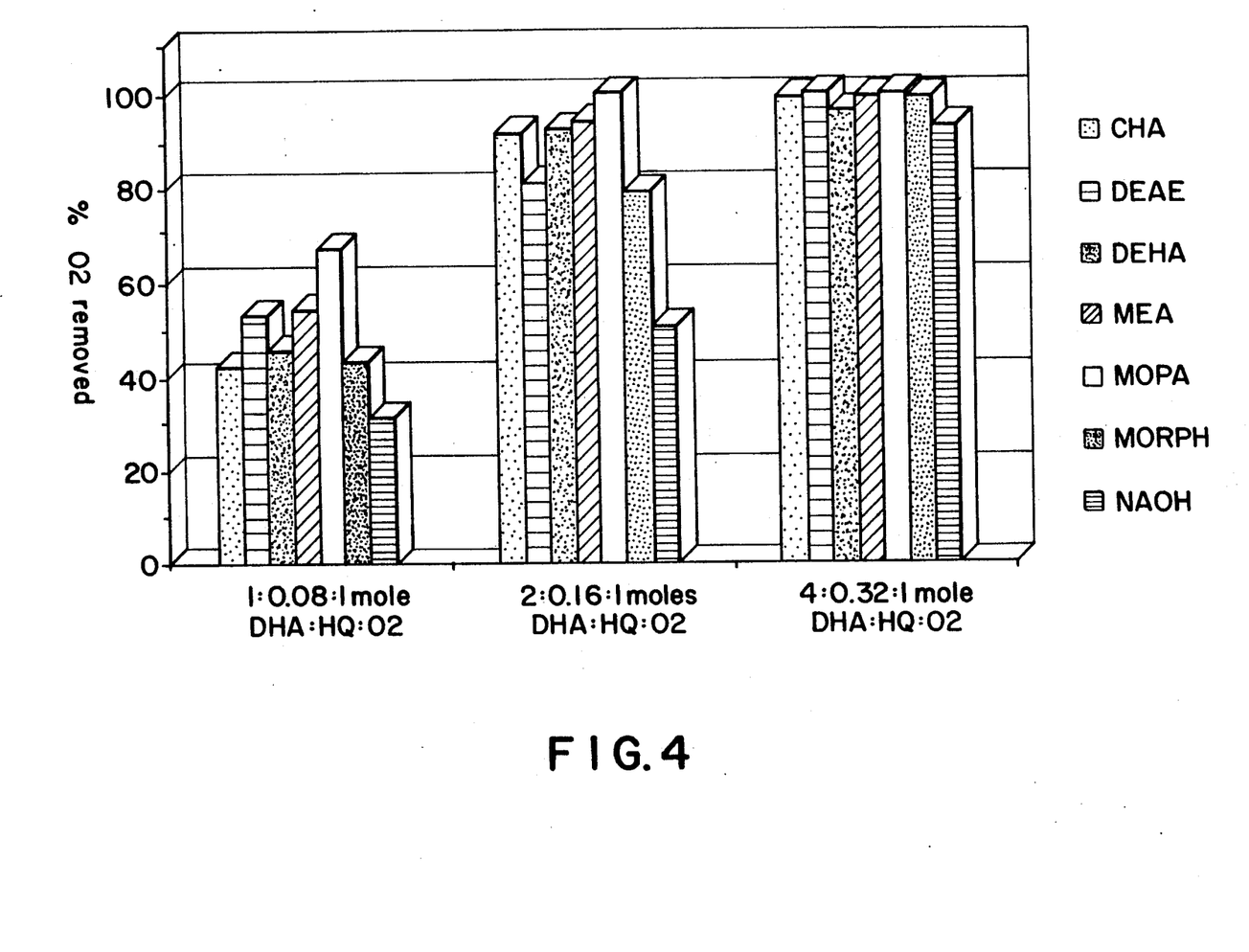
FIG. 4, presented for comparison purposes, demonstrates the combination of dihydroxyacetone and 10% hydroquinone with volatile amines at varying mole ratios to oxygen. This figure clearly demonstrates that the ternary combination is necessary to obtain the outstanding performance required to remove both oxygen and CO$_2$ from boiler waters being treated.
Figure 5:
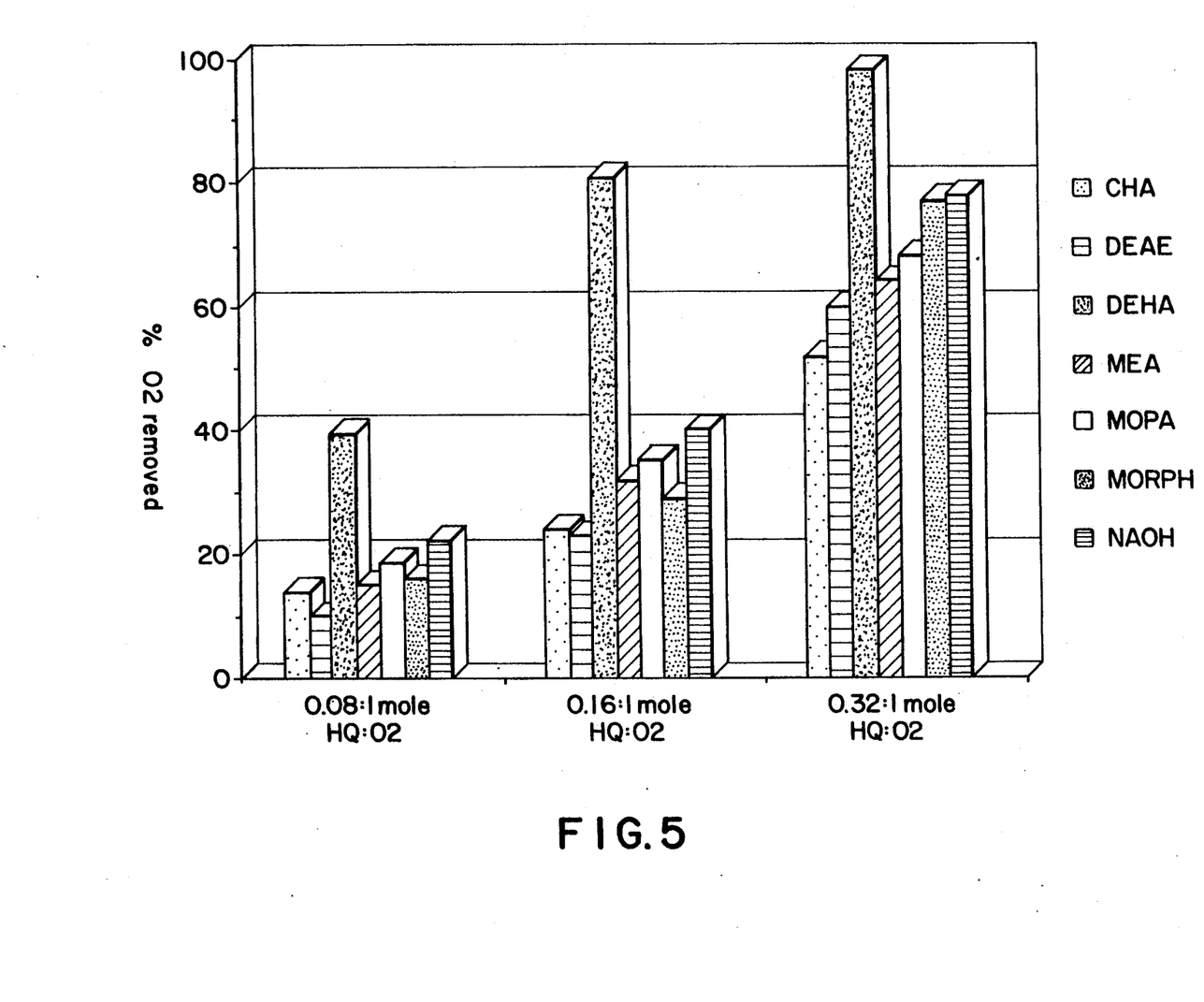
FIG. 5 demonstrates, comparatively, just hydroquinone alone as an oxygen scavenger versus various of the volatile amines. It is noted that the volatile amine, diethylhydroxylamine, in combination with hydroquinone, gives outstanding performance. This should not be too surprising since diethylhydroxylamine has been known to be an oxygen scavenger by itself, whereas the other amines have not been demonstrated to contain this capacity. Also, FIG. 5 demonstrates that the other amines with hydroquinone by itself do not provide any added oxygen scavenging capabilities greater than NaOH with hydroquinone by itself.
Figure 6:
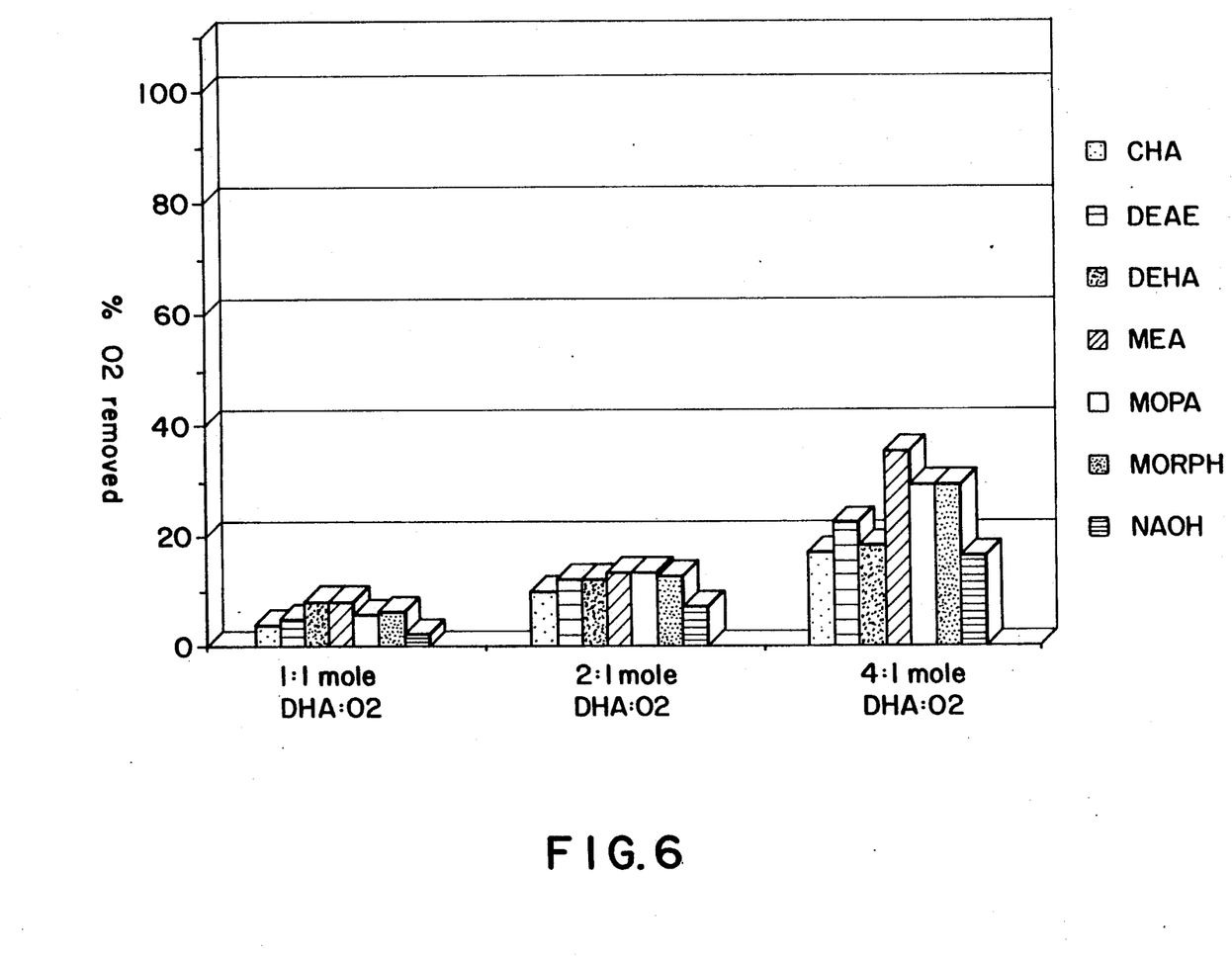
FIG. 6 presents graphical representation of just the combinations of dihydroxyacetone with various amines and NaOH. The oxygen scavenging performance is inadequate.

FIG. 1 presents a diagram of a Bench Test Oxygen Scavenger Experimental Apparatus. This apparatus is used to measure the effectiveness of the combination of the ingredients of this invention for the purpose of treating oxygen. Standard conditions used in this test include a dosage of two moles of scavenger/mole of oxygen, based on the oxygen of the make-up water. Temperature is maintained at 185° F. The oxygen source is air-saturated, de-ionized water containing ~8.5 ppm oxygen. The pH of the water is adjusted to 9.3–9.5 with NaOH. In addition, a field temperature simulator (FTS) operating at 300° F., has also been used to test the combinations of the invention. This higher temperature unit is designed to determine oxygen and $CO_2$ reactions at temperatures and oxygen concentrations similar to those found in operating boilers. Volatility is at least a partial measure of the ability of the components in our formulations to volatilize and therefore both scavenge oxygen and neutralize $CO_2$ in the condensate system and condensate waters. The volatility is discussed later. This FTS simulator contains two in-line stainless steel stage heaters, both running at 300° F. through which approximately 60 ml/minute de-aerated water with oxygen fed at 100-120 ppb (parts per billion) flows. This test water flows from the heaters then through test lines, and finally through a regulated back pressure valve of approximately 200 psig. Oxygen content is monitored continuously on-line and oxygen scavenging treatments are added intermittently or continuously to test their effectiveness in removing oxygen. Results are essentially the same as provided with testing at 185° F. in the Test apparatus of FIG. 1.

In addition to the above tests used to measure oxygen scavenging capability, other tests were performed to measure volatility, corrosion, and passivation capabilities of the formulations used.

Analytical procedures were developed for measuring dihydroxyacetone, which procedures were based on enzyme tests or fluorescent tests. Also a liquid chromatography method was developed for measuring very low concentrations of dihydroxyacetone.

Volatility is defined as the concentration of a component of our formulations found in the steam or steam condensate versus the concentration of the component found in the boiler blowdown water or in the liquid phase and is presented in Table II. To provide $CO_2$ neutralizing and oxygen scavenging capabilities in overhead condenser systems, the program protocol developed must provide a vapor to liquid distribution ratio, or volatility as above measured which provides for the presence of at least 0.1 and up to at least 1.0 percent of each component of the formulation in the condensate from condensing steam generated in a boiler, which boiler waters have been treated with the formulations above described. These measurements were performed either by the techniques cited above, or by other standard analytical procedures such as nuclear magnetic resonance (NMR) spectroscopy, Fourier Transform Infared Spectroscopy (FTIR), Thermal Gravametric Analysis (TGA), Differential Scanning Calorimetry (DSC), and TGA/FTIR. The liquid chromatography method used to measure dihydroxyacetone (DHA) utilised 2,4-dinitrophenylhydrazine (DNPH) and the reaction products of DNPH and DHA, followed by liquid chromatography. Volatility was measured using a scale boiler test operating a standard laboratory scale boiler for two days at each of fifty, six hundred, and one thousand psig, ten cycles of concentration, heat flux of 110,000 Btu/sq. ft./hr. with feed water containing 28 ppm NaCl and having a pH of 10. The formulations tested for volatility measurements were present such that the primary oxygen scavenger (DHA) was dosed at fifty times stoichiometry based on feed water analysis indicating 10 ppb oxygen. All the oxygen was removed.

The results of the above testing are presented in Table I, Table II, and Table III, hereinafter presented.

TABLE I

| BENCH OXYGEN SCAVENGER SCREENING AT 185° F. | |
|---|---|
| Standard Condition: | 185° F., 20 ml/min., pH of Make-up = 9.3-9.5., Baseline Oxygen without $O_2$ Scavenger = 5.8-6.4 ppm, Dihydroxyacetone (DHA) = 48.1 ppm Hydroquinone (HQN) = 4.81 ppm |
| Notes: | Experimental Error = ±3% pH indicated = pH of product pH of effluent water = 8.5-9.5 |

| Molecule(s) | pH/with | Color | % $O_2$ Removed | % Increase over DHA Alone |
|---|---|---|---|---|
| DHA with CAUSTIC | | | | |
| DHA | 8.5, 10.0/NaOH | Colorless | 15 | 0 |
| DHA | 11.5, 13.0/NaOH | yellow | 24 | 9 |
| DHA (pH$_i$10.9/NaOH reflux @ 100° C. | 5.0, | brown after reflux | 30 | 15 |
| DHA (pH$_i$10.9/NaOH reflux @ 100° C. | 5.0 then 10.0 with NaOH | brown | 28 | 13 |
| DHA with METAL CATALYST | | | | |
| DHA/11 ppm Cu | 11.5/NaOH | brown | 36 | 21 |
| DHA/2.6 ppm Cu | 11.5/NaOH | brown | 36 | 22 |
| DHA/0.6 ppm Cu | 11.5/NaOH | yellow | 26 | 11 |
| DHA/10 ppm Mn | 11.5/NaOH | brown | 26 | 11 |
| DHA/1 ppm Mn | 11.5/NaOH | yellow | 23 | 8 |
| DHA/2 ppm Co | 11.5/NaOH | yellow | 20 | 5 |
| DHA/2,5 ppm Fe | 10.5/NaOH | yellow | 18 | 3 |
| DHA with AMINE | | | | |
| DHA/DEAE | 10.0 | colorless | 15 | 0 |
| DHA/DEAE | 11.5 | yellow | 28 | 13 |
| DHA/DEAE/Cu | 11.5 | brown | 29 | 14 |
| DHA/Morpholine | 9.5 | colorless | 17 | 2 |
| DHA/Morpholine | 10.5 | colorless | 30 | 15 |

| Molecules (s) | pH/with | Color | % $O_2$ Removed | % Increase over DHA (pH10, NaOH) |
|---|---|---|---|---|
| HQN (10% wt.) with CAUSTIC, AMINE, or METAL CATALYST | | | | |
| HQN | 9.5/NaOH | yellow | | 27 |
| HQN | 10.5/NaOH | brown | | 25 |
| HQN/Morpholine | 9.5 | brown | | 21 |
| HQN/Morpholine | 10.5 | brown | | 21 |
| HQN/DEAE | 9.5 | brown | | 17 |

TABLE I-continued
BENCH OXYGEN SCAVENGER SCREENING AT 185° F.

| Molecule(s) | pH/with | Color | % $O_2$ Removed | |
|---|---|---|---|---|
| HQN/DEAE | 10.5 | brown | 18 | |
| HQN/Co 2 ppm | 10.5/NaOH | brown | 24 | |
| DHA/10% HQN with CAUSTIC | | | | |
| Theoretical by summation: DHA/10% HQN = 15% + 26% = 41% | | | | |
| DHA/10% HQN | 9.5/NaOH | peach/pink | 47 | 32 |
| DHA/10% HQN | 10.0/NaOH | peach/pink | 43 | 28 |
| Theoretical summation: DHA/10% HQN = 24% + 25% = 49% | | | | |
| DHA/10% HQN | 11.5/NaOH | peach/pink | 50 | 35 |
| DHA/10% HQN and AMINE | | | | |
| DHA/10% HQN/Morph | 10.5 | peach/pink | 88 | 73 |
| DHA/10% HQN/Morph | 10.5, repeat | peach/pink | 94 | 79 |
| DHA/10% HQN/CHA | 10.5 | colorless | 92 | 77 |
| DHA/10% HQN/DEAE | 10.5 | clear | 62 | 47 |
| DHA/10% HQN/DEAE | 10.5, repeat | clear | 70 | 55 |
| DHA/10% HQN/MEA | 10.5 | purple | 88 | 73 |
| DHA/10% HQN/DMAIP | 10.5 | yellow | 92 | 77 |
| DHA/10% HQN/MOPA | 10.5 | brown | 89 | 74 |
| DHA/10% HQN/ DEHA (12.6%) | 10.5 | yellow | 100 | 85 |
| DHA (1:1)/10% HQN/ DEHA 100 ppm | 10.5/Morph | | 91 | 76 |
| DHA (1:1)/10% HQN/ DEHA 400 ppm | 10.5/Morph | | 91 | 76 |
| DHA/10% HQN/Morph/ Cu 2 ppm | 10.5 | yellow | 88 | 73 |
| DHA/10% HQN/DEAE/ Cu 2 ppm | 10.5 | yellow | 88 | 73 |
| HQN at 20% to 40% wt. with CAUSTIC or AMINE | | | | |
| 2x HQN (20% wt.) | 9.5/NaOH | yellow | 46 | |
| 2x HQN 0.33 mole ratio | 10.5/NaOH | brown | 37 | |
| 3x HQN 0.495 mole ratio | 9.5/NaOH | yellow | 45 | |
| 3x HQN | 10.5/NaOH | brown | 60 | |
| 3x HQN/DEAE | 10.5 | yellow | 75 | |
| 3x HQN/Morpholine | 10.5 | pink | 83 | |
| 4x HQN (40% wt.) | 10.5/NaOH | brown | 88 | |
| 4x HQN 0.66 mole ratio | 10.5/DEAE | brown | 97 | |
| 4x HQN/Morpholine | 10.5 | brown | 98 | |
| Parr Bomb DHA @ 138° C. | 3.0 | dark brown | 18 | |
| OPTIMIZATION OF DHA/HQN TREATMENT | | | | |
| DHA (2:1)/10% HQN | 10.5/Morph | brown | 91 | |
| DHA/20% HQN/Morph | 10.5 | brown | 95 | |
| DHA/30% HQN/Morph | 10.5 | brown | 97 | |
| DHA/40% HQN/Morph | 10.5 | brown | 98 | |
| DHA (1.5:1)/40% HQN | 10.5/Morph | brown | 98 | |
| DHA (1:1)/40% HQN | 10.5/Morph | brown | 97 | |
| DHA (0.5:1)/40% HQN | 10.5/Morph | peach | 64 | |
| DHA (2:1)/10% HQN | 10.5/Morph | brown | 91 | |
| DHA (1:1)/10% HQN | 10.5/Morph | pink | 64 | |
| DHA (0.5:1)/10% HQN | 10.5/Morph | brown | 55 | |
| DHA/10% HQN/ DEHA 1% | 10.5/Morph | yellow | 97 | |
| DHA/10% HQN/ DEHA 4% | 10.5/Morph | yellow | 97 | |
| DHA (1:1)/10% HQN/ DEHA 4% | 10.5/Morph | | 97 | |
| pH EFFECT | | | | |
| DHA/10% HQN/Morph | 10.5/9.5% Morph | | 90 | 75 |
| DHA/10% HQN/Morph | 10.5/6.0% Morph | | 37 | 22 |
| DHA/10% HQN/Morph | 10.5/4.0% Morph | | 22 | 7 |
| DHA/10% HQN/Morph | 10.5/3.0% Morph | | 16 | 1 |
| DHA/10% HQN/Morph | 10.5/1.5% Morph | | $O_2$ increased | |

| Molecule(s) | pH/with | Color | % $O_2$ Removed | |
|---|---|---|---|---|
| HQN with CAUSTIC | | | | |
| HQN 10% | 9.5/NaOH | yellow | 27 | |
| HQN 10% | 10.5/NaOH | brown | 25 | |
| OTHER MOLECULES - 48.1 ppm of | | | | |
| EA | 10.5/NaOH | clear | 38 | |
| CHZ | 10.7/NaOH | clear | 5 | |
| DEHA (51.6 ppm) | 10.5/NaOH | clear | 13 | |
| DEHA (192 ppm) | no adj. | clear | 0 | effluent pH 8.2 |
| DEHA (192 ppm) | 10.5/NaOH | clear | 8 | |
| DEHA (192 ppm) | 10.5/Morph | clear | 21 | |
| DEHA (768 ppm) | 10.5/NaOH | clear | 15 | |

TABLE I-continued
BENCH OXYGEN SCAVENGER SCREENING AT 185° F.

| DEHA (768 ppm) | 10.5/Morph | clear | 23 |
|---|---|---|---|

EA = Erythorbic Acid
CHZ = Carbohydrazide

TABLE II

| Volatility Definition: | Vapor-Liquid Distribution Ratio or $V/L$ = ppm in the steam/ppm in the blowdown | | | |
|---|---|---|---|---|
| V/L | %[FW] [FW] Feed | [BD]$^a$ [FW] | Fire-rod | % Decomposed$^b$ |
| 1. 600 psig | | | | |
| DHA 0.011 | 3 | 96 | passivated | 89 |
| OHQN 0.036 | 7 | 70 | reddish | 25–50 |
| DEHA 5.33 | 144 | 0.05 | well-passivated | 60 |
| 2. 200 psig | | | | |
| DHA 0.04–0.08 | | | | |
| 3. 50 psig | | | | |
| DHA 0.13 | | | shiny w/spots | |
| 0.017 (repeat) | | 69.2 | shiny w/strips | |
| HQN 0.0054 | 17 | 40 | shiny black more uniform film | |
| DEHA 6.00 | 85 | 0.22 | shiny w/strips | |

Notes:
[FW] = oxygen scavenger concentration in ppm in feedwater
[BD] = oxygen scavenger concentration in ppm in blowdown
$^a$ = boiler cycle of 10; 10 values: among other reasons, could suggest non-volatile and low decomposition in the blowdown
>>10: indicating higher b.p. than water and not forming azeotrope with water, or decompose greatly in the feedwater
<1: indicating loss of reducing capacity due to decomposition in the blowdown, or very high volatility
$^b$ = 100 × ([BD] of 50 psig - [BD] of 600 psig)/[BD] of 50 psig

TABLE III
O$_2$ REMOVAL EXPERIMENT @ 185° F.

| | | | | Percent O$_2$ Removed | | |
|---|---|---|---|---|---|---|
| No | % DHA | % HQN | Amine at 2% | 1 × Dosage | 2 × Dosage | 4 × Dosage |
| 1 | 0 | 0 | CHA | 0 | <3 | 0 |
| 2 | 1.82 | 0 | CHA | 4 | 10 | 22/12 |
| 3 | 0 | 0.18 | CHA | 14 | 24 | 52 |
| 4 | 1.82 | 0.18 | CHA | 42 | 91/92 | 99 |
| 5 | 1.82 | 0 | DEAE | 5 | 9/15 | 22 |
| 6 | 0 | 0.18 | DEAE | 10 | 28/18 | 60 |
| 7 | 1.82 | 0.18 | DEAE | 53 | 92/70 | 100 |
| 8 | 0 | 0 | DEHA | 6 | 9 | 12 |
| 9 | 1.82 | 0 | DEHA | 8 | 12 | 18 |
| 10 | 0 | 0.18 | DEHA | 40/39 | 82/79 | 98 |
| 11 | 1.82 | 0.18 | DEHA | 50/49 | 85/100 | 97/95 |
| 12 | 0 | 0 | MEA | 0 | 0 | 0 |
| 13 | 1.82 | 0 | MEA | 8 | 15/11 | 35 |
| 14 | 0 | 0.18 | MEA | 15 | 32/32 | 62/66 |
| 15 | 1.82 | 0.18 | MEA | 54 | 96/92/88 | 100/98 |
| 16 | 0 | 0 | MOPA | 0 | 0 | 0 |
| 17 | 1.82 | 0 | MOPA | 8/3/0 | 14/12/13 | 29 |
| 18 | 0 | 0.18 | MOPA | 15/18/19 | 35/35 | 68 |
| 19 | 1.82 | 0.18 | MOPA | 67 | 100 | 100 |
| 20 | 1.82 | 0 | MORPH | 6 | 12/13 | 27 |
| 21 | 0 | 0.18 | MORPH | 16 | 37/21 | 77 |
| 22 | 1.82 | 0.18 | MORPH | 43/43 | 78/80/94 | 99/99 |
| 23 | 1.82 | 0 | NaOH | 2 | 7 | 16 |
| 24 | 0 | 0.18 | NaOH | 22/22 | 40 | 78 |
| 25 | 1.82 | 0.18 | NaOH | 31 | 54/47 | 93 |

Dosage = The formulation containing the weight percent of each ingredient listed were added to water having an estimated oxygen content of 8.5 ppm, the formulation had a pH = 10.5. The water in the system had an initial measured O$_2$ content between 6-7 ppm, a pH of 9.2-9.6, which pH after the test was changed to from 8.5-10.8 depending on formulation tested.
/ = Duplication of experimental result
*1 × Dosage = Dosage relative to the molar ratio of DHA to O$_2$ as if DHA were present in all formulations Also, to better demonstrate the surprising results when the ternary combinations above are made, FIGS. 2, 3, 4, and 5 are presented.

Having descibed our invention, we claim:

1. A method of removing dissolved oxygen from and neutralizing dissolved CO$_2$ in boiler waters which comprises adding to said boiler waters with an effective oxygen removing amount of a combination product comprising (a) dihydroxyacetone, (b) hydroquinone, and (c) a volatile amine.

2. The method of claim 1 which comprises additionally adding to said boiler waters with the combination product also containing a filming amine.

3. The method of claim 1 which comprises adding to boiler waters with a combination product containing (a):(b):(c) in the weight ratio ranging from about 1:0.01:0.10 to about 1:1:100; and further adding to said waters with said combination product such that the molar ratio of dihydroxyacetone to dissolved oxygen in the boiler waters is at least 0.5:1 to about 10:1.

4. The method of claim 3 wherein the combination product comprises (a) dihydroxyacetone, (b) hydroquinone, and (c) a volatile amine dissolved in water in the ratio of (a):(b):(c) ranging from 1.0:0.1:1.0 to about 1.0:0.75:50, and further, wherein the boiler waters are such that the molar ratio of dihydroxyacetone to dissolved oxygen ranges from at least 1:1 to about 8:1.

5. The method of claim 4 wherein the combination product is added to the boiler waters so that the molar ratio of dihydroxyacetone to dissolved oxygen ranges from about 1:1 to about 4:1.

6. The methods of claims 4 or 5, wherein the combination product additionally contains at least 1.0 weight percent of filming amine.

7. A method of removing both dissolved oxygen and dissolved carbon dioxide from boiler waters which comprises adding to said waters with an effective oxygen reducing amount of a combination product containing the ingredients:
(a) dihydroxyacetone 0.1–10.0 wt. %
(b) hydroquinone 0.005–10.0 wt. %
(c) a volatile amine chosen from the group consisting of at least one amine from the group morpholine, cyclohexylamine, diethylaminoethanol, methoxypropylamine, monoethanolamine, dimethylaminoisopropanol, isopropylamine, and dialkylhydroxylamines having the structure where $R_1$ and $R_2$ individually and independently are chosen from linear and branched alkyl groups having from 1–4 carbon atoms, 0.01–50.0 wt. %
(d) water the remainder,
such that the weight ratio of (a):(b) does not exceed 1:1.

8. The method of claim 7 wherein the combination product additionally contains from 0.1 to about 10 weight percent of a filming amine.

9. The method of claims 7 or 8 wherein the combination product is added to the boiler water such that the molar ratio of dihydroxyacetone to dissolved oxygen in said boiler water ranges from about 0.5:1.0 to about 8.0 to 1.0.

10. The method of claim 7 wherein the combination product contains the ingredients:
(a) dihydroxyacetone 1.0–5.0 wt. %
(b) hydroquinone 0.1–1.0 wt. %
(c) morpholine 0.1–20.0 wt. %
(d) water remainder 11. The method of claim 7 wherein the combination product contains the ingredients:
(a) dihydroxyacetone 1.0–5.0 wt. %
(b) hydroquinone 0.1–1.0 wt. %
(c) cyclohexylamine 0.1–20.0 wt. %
(d) water remainder 12. The method of claim 7 wherein the combination product contains the ingredients:
(a) dihydroxyacetone 1.0–5.0 wt. %
(b) hydroquinone 0.1–1.0 wt. %
(c) diethylaminoethanol 0.1–20.0 wt. %
(d) water remainder

13. The method of claim 7 wherein the combination product contains the ingredients:
(a) dihydroxyacetone 1.0–5.0 wt. %
(b) hydroquinone 0.1–1.0 wt. %
(c) methoxypropylamine 0.1–20.0 wt. %
(d) water remainder 14. The method of claim 7 wherein the combination product contains the ingredients:
(a) dihydroxyacetone 1.0–5.0 wt. %
(b) hydroquinone 0.1–1.0 wt. %
(c) monoethanolamine 0.1–20.0 wt. %
(d) water remainder 15. The method of claim 7 wherein the combination product contains the ingredients:
(a) dihydroxyacetone 1.0–5.0 wt. %
(b) hydroquinone 0.1–1.0 wt. %
(c) dimethylaminoisopropanol 0.1–20.0 wt. %
(d) water remainder 16. The method of claim 7 wherein the combination product contains the ingredients:
(a) dihydroxyacetone 1.0–5.0 wt. %
(b) hydroquinone 0.1–1.0 wt. %
(c) isopropylamine 0.1–20.0 wt. %
(d) water remainder 17. The method of claim 7 wherein the combination product contains the ingredients:
(a) dihydroxyacetone 1.0–5.0 wt. %
(b) hydroquinone 0.1–1.0 wt. %
(c) dialkylhydroxylamines having the structure;

where $R_1$ and $R_2$ individually and independently are chosen from linear and branched alkyl groups having from one to four carbon atoms 0.01–50.0 wt. %
(d) water remainder 18. The methods of claim 10, 11, 12, 13, 14, 15, 16, or 17, wherein the combination product additionally contains from 0.1 to about 10.0 weight percent of a filming amine chosen from the group consisting of octadecylamine and ethoduomeen and mixtures thereof.

19. The method of claims 7 or 8 wherein effective oxygen scavenging catalytic amounts of soluble metal salts of cobalt, copper, manganese, or mixtures thereof are included in the combination product.

20. The method of claims 7 or 8 wherein the boiler waters are chosen from the group consisting of boiler feed water, internal boiling waters, steam condensate waters, or any combinations thereof.

21. The methods of claims 1 or 7 wherein the boiler waters have a pH ranging from 8.0–11.0.

* * * * *